United States Patent [19]

Kitamura

[11] 4,420,761

[45] Dec. 13, 1983

[54] SCANNING RECORDING APPARATUS

[75] Inventor: Takashi Kitamura, Yokohama, Japan

[73] Assignee: Canon Kabushiki Kaisha, Tokyo, Japan

[21] Appl. No.: 381,686

[22] Filed: May 25, 1982

[30] Foreign Application Priority Data

Jun. 10, 1981 [JP] Japan .................................. 56/89257

[51] Int. Cl.[3] .......................... G01D 9/42; G01D 15/10
[52] U.S. Cl. .................................... 346/108; 346/76 L
[58] Field of Search ............................... 346/108, 76 L

[56] References Cited

U.S. PATENT DOCUMENTS

| 4,019,186 | 4/1977 | Dressen et al. | 346/108 |
| 4,060,323 | 11/1977 | Hirayama et al. | 346/76 L X |
| 4,212,018 | 7/1980 | Ohnishi et al. | 346/76 L |
| 4,253,102 | 2/1981 | Kataoka et al. | 346/108 |

Primary Examiner—Donald A. Griffin
Attorney, Agent, or Firm—Fitzpatrick, Cella, Harper & Scinto

[57] ABSTRACT

A recording apparatus for image recording by scanning having plural dots arranged inclined to the scanning direction, wherein the phase difference of the plural dots in the scanning direction is compensated by control signals generated by an oscillator.

12 Claims, 5 Drawing Figures

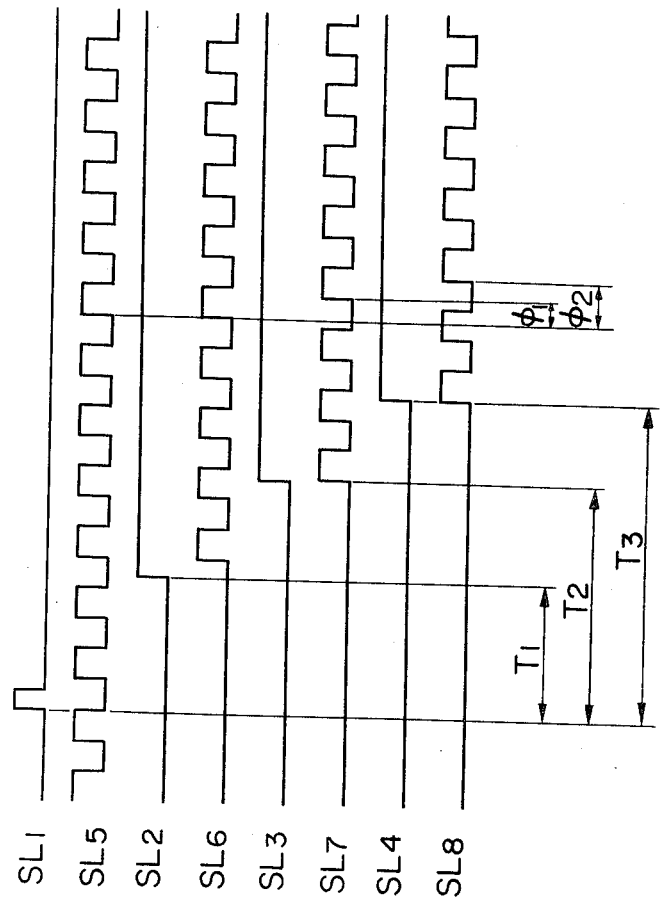

SCANNING RECORDING APPARATUS

BACKGROUND OF THE INVENTION

1. Field of the Invention

The present invention relates to a recording apparatus for image recording by scanning with plural dots, such as a multi-beam laser printer or a multi-head ink jet printer.

2. Description of the Prior Art

In the field of recording apparatus for information recording on a recording medium, there is already known an image recording apparatus capable of forming plural dots in the subsidiary scanning direction in order to achieve high-speed recording. In such an image recording apparatus utilizing plural dots, it is also known to mount a semi-conductor laser array, used as the light source in the laser beam printer, or a multiple head, used in the ink jet printer, in an inclined position with respect to the subsidiary scanning direction, in order to increase the dot density in said subsidiary scanning direction. However, plural dots simultaneously formed by such inclined laser array or multiple head give inevitably give rise to phase differences between said dots along the main scanning direction, since such dots are not aligned in the subsidiary scanning direction.

In a conventional method for compensating the phase differences between such dots along the main scanning direction, a particular dot among said plural dots is detected at a determined position to generate a detection signal, which is utilized, with suitable delays, to form control signals for other dots. It has, however, been difficult, in such a method, to form control signals for other dots with exact timings.

In order to overcome this drawback the present applicant disclosed, in the U.S. patent application Ser. No. 164,522, a method of forming control signals for the dots by means of a high-frequency oscillating circuit, but such an oscillating circuit is very expensive and is a highly complicated in structure. Besides, though the error in each dot control signal can be reduced if a higher frequency is selected in the oscillating circuit, the selection of the frequency in practice has posed certain difficulties since it is to be determined in relation to other factors of the apparatus.

SUMMARY OF THE INVENTION

The object of the present invention is to provide a scanning recording apparatus capable of exact recording by compensation of the phase differences between the dots along the main scanning direction explained above.

Another object of the present invention is to provide a scanning recording apparatus capable of forming control signals for the dots by means of a single oscillator.

Still other objects of the present invention will be made fully apparent from the following description of the preferred embodiments to be taken in conjunction with the attached drawings.

BRIEF DESCRIPTION OF THE DRAWINGS

FIG. 5 is a timing chart showing various signals in the circuit shown in FIG. 4

DETAILED DESCRIPTION OF THE PREFERRED EMBODIMENTS

Figure 1:
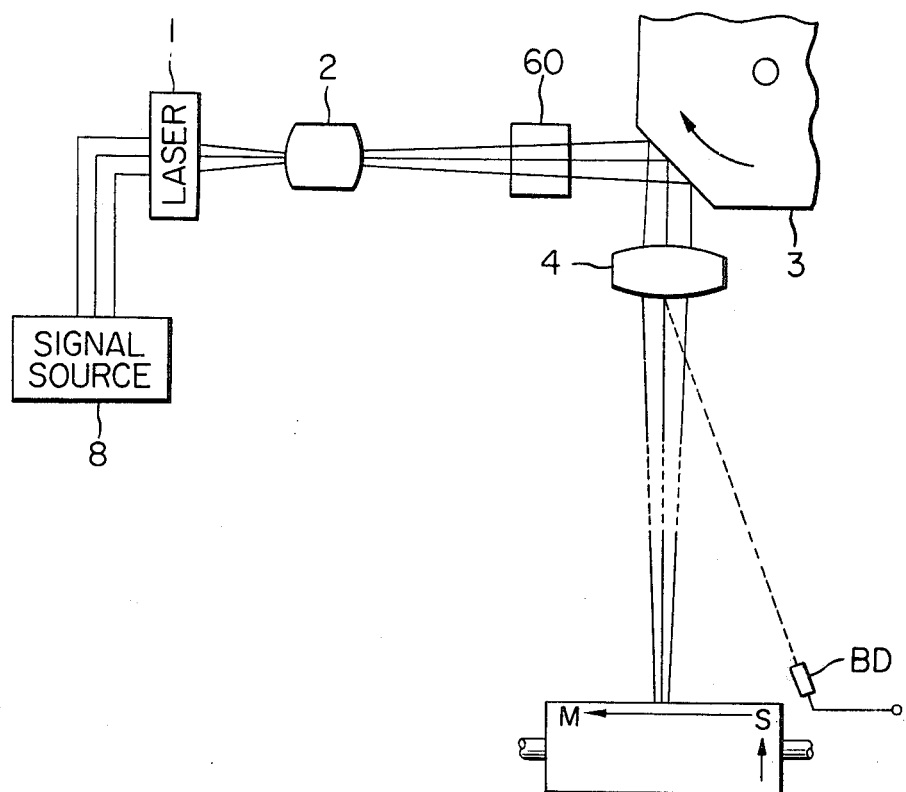
FIG. 1 is a schematic view showing an example of image recording with a multi-beam laser printer.
Figure 2:
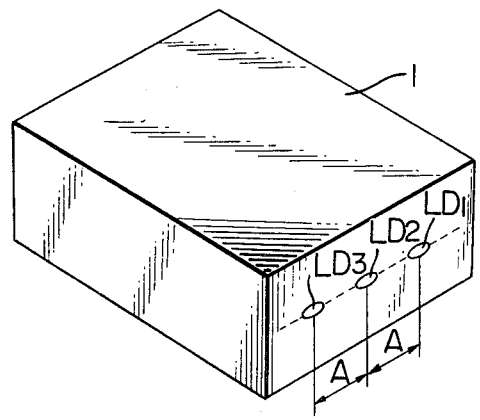
FIG. 2 is a perspective view of a semi-conductor laser array.

Now the present invention will be described by reference to an embodiment shown in the attached drawings. In a multi-beam laser printer shown in FIG. 1, a semi-conductor laser array 1 is provided with plural light-emitting sources or laser diodes LD1, LD2, LD3 arranged along a line in intervals A as shown in FIG. 2. The beam emissions from said sources LD1, LD2, LD3 are individually controllable by image signals from a signal source 8.

Such beams are guided, through an optical system 2, to an image rotator 60 for rotating the beam arrangement, then introduced to a rotary polygonal mirror 3 and focused on a photosensitive drum 5 through a focusing optical system 4. Thus the beams achieve main scanning in a direction M, in combination with subsidiary scanning in a direction S achieved by the rotation of the drum.

Figure 3:
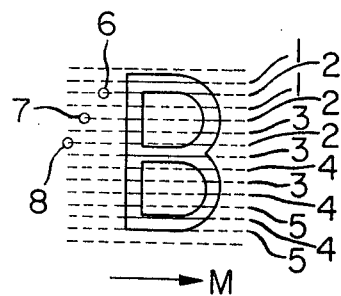
FIG. 3 is a schematic view showing an example of image recording in a multi-beam laser printer.

FIG. 3 shows the state of phase differences between the dots along the main scanning direction, resulting from the inclined positioning of the semi-conductor laser array as explained in the foregoing, wherein 1 to 5 indicate the scanning lines formed in the first to fifth scanning strokes, respectively, and 6, 7 and 8 indicate the spots formed by the first to third laser beams respectively in the second scanning stroke. Thus, in order to record a vertical line, for example, the beam 6 is lighted at first, then the beam 7 is lighted after a determined delay, and the beam 8 is lighted after another delay because of the aforementioned inclined positioning of the semi-conductor laser array.

Figure 4:
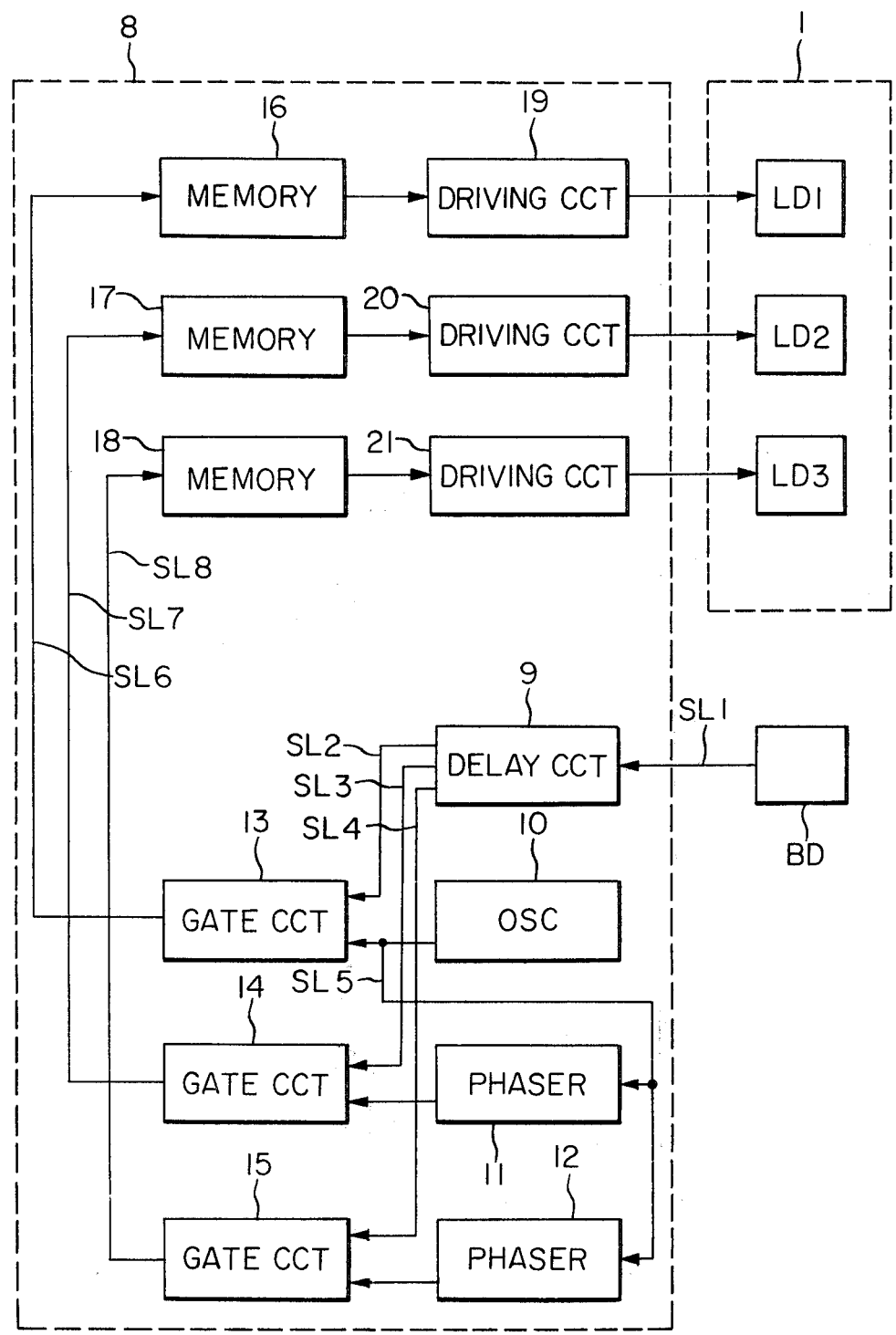
FIG. 4 is a block diagram of an embodiment of the present invention.

FIG. 4 is a block diagram for sequentially driving the laser diodes, wherein there is provided a delay circuit 9 for forming synchronizing signals for different scanning lines with determined delays in response to a reference synchronizing signal; an oscillator 10 for generating clock signals for sequential readout of memories; phasers 11, 12 for adjusting aberration in the synchronization within one clock interval; gate circuits 13, 14, 15 having AND gates; memories 16, 17, 18 storing information for modulating the first, second and third scanning lines respectively; driving circuits 19, 20, 21 for driving lasers; a bear detector BD for detecting the first laser beam; and laser diodes LD1, LD2 and LD3. There is also shown a synchronizing signal SL1 obtained from the first laser beam; delayed synchronizing signals SL2, SL3, SL4 obtained from the delay circuit 9; a clock or pulse signal SL5 obtained from the oscillator 10; and clock or pulse signals SL6, SL7, SL8 for reading the information stored in the memories 16, 17 and 18. Although multiple beams are utilized in this case, conventional technology for detecting a single beam with the beam detector BD is applicable for detecting the first beam 6. In response to the synchronizing signal SL1 obtained from the beam detector BD the delay circuit 9 releases the signal SL2 for initiating the modulation of the first laser diode. In response to said signal SL2, the clock signal SL5 from the oscillator 10 is supplied through the gate circuit 13 to the memory 16 as the pulse signal SL6 for reading the memory 16, whereby the driving circuit 19 starts the modulation of the laser LD1. The signal SL3 is released with a determined delay after the signal SL2, and enables the clock signal SL5 which is supplied through the phaser 11 for fine phase adjustment smaller than the clock interval, whereby the signal SL7 is supplied to the memory 17 for reading the information stored therein. Said information is utilized for modulating the laser LD2 through the driving circuit 20. Similarly the synchronizing signal SL4 generated with another determined delay from the synchronizing signal SL3 enables the clock signal which is phase adjusted in the phaser 12, thereby supplying the signal SL8 for reading the information from the memory 18, thus modulating the laser LD3 through the driving circuit 21.

The phaser 11 or 12 can be easily obtained by a combination of an integrating circuit having resistors and condensers of a Schmidt triggering circuit. Also a phase delay up to a clock interval can be obtained by utilizing plural units of such phaser.

FIG. 5 is a timing chart showing various signals in the circuit shown in FIG. 4, wherein T1, T2 and T3 indicate the periods from the synchronizing signal SL1 to the start of modulation of the first, second and third lasers LD1, LD2, LD3, respectively and $\phi 1$ and $\phi 2$ show the amounts of phase shift by the phasers 11, 12. Without such phasers, errors smaller than one clock interval will inevitably occur in T2 and T3.

Although the signal SL7 is generated simultaneously with the synchronizing signal SL3 in FIG. 5, the signal SL3 may precede the signal SL7 by a period not exceeding a half clock interval. The same consideration applies also to the signals SL4 and SL8.

In the foregoing embodiment three lines are scanned simultaneously, but it is also possible to modify the number of simultaneously scanned lines to two or four. The aforementioned delay circuit may be composed of a digital circuit or an analog circuit. Also said delay circuit may be dispensed with in case the distance between the first beam 6 and the last beam 8 does not exceed one clock interval.

As explained in the foregoing, the present invention permits the use of a beam detector already known in the conventional single beam laser printer since the phase difference of dots along the main scanning line resulting from the inclined positioning of the light source array or the multiple ink jet head is compensated by delayed record timings achieved by phase shifting circuits. Also an ink jet printer with plural nozzles can be controlled by a single synchronizing signal in the same manner as in a single-nozzle ink jet printer.

The present invention further provides an image of an improved quality since a phase error smaller than one clock interval can also be correctable. Furthermore eventual aberration in the synchronization of different scanning lines is completely avoided since the clock signals for reading different memories are obtained from a single oscillator.

The present invention is by no means limited to the foregoing embodiment but is subject to various modifications within the scope and spirit of the appended claims.

What I claim is:

1. A scanning recording apparatus, comprising:
   recording means for forming plural dots in the subsidiary scanning direction;
   clock generator means for generating a clock signal; and
   control means for forming, from the clock signal generated by said clock generator means, plural reference signals having the same frequency but a different phase from that of the clock signal, and for controlling said recording means by the plural reference signals.

2. A scanning recording apparatus according to claim 1, further comprising phase shifting means for adjusting the phase of the clock signal generated by said clock generator means in order to form plural reference signals.

3. A scanning recording apparatus according to claim 2, wherein said phase shifting means includes an integrating circuit having of resistors, condensers and a Schmidt trigger circuit.

4. A scanning recording apparatus according to claim 2, further comprising signal forming means for forming an enabling signal for enabling said recording means.

5. A scanning recording apparatus according to claim 4, further comprising synchronizing signal forming means for forming plural synchronizing signals delayed by determined periods from the enabling signal formed by said signal forming means, wherein said control means is adapted to control said recording means in response to said plural reference signals and said plural synchronizing signals.

6. A scanning recording apparatus according to claim 5, wherein said synchronizing signal forming means includes a delay circuit.

7. A scanning recording apparatus according to claim 5, wherein said control means includes gate circuits for receiving said plural reference signals and delayed synchronizing signals.

8. A scanning recording apparatus according to claim 7, wherein said control means includes memory means from which information for controlling said recording means is read in response to the output signal from said gate circuits.

9. A scanning recording apparatus, comprising:
   recording means for forming plural dots in the subsidiary scanning direction;
   clock generator means for generating a clock signal;
   reference signal generator means for forming, from the clock signal generated by said clock generator means, plural reference signals having the same frequency but a different phase from that of the clock signal;
   synchronizing signal forming means for forming the plural synchronizing signals with the period of a half clock interval preceding said reference signals; and
   control means for enabling said recording means in response to said plural reference signals and said plural synchronizing signals.

10. A scanning recording apparatus according to claim 9, wherein said reference signal generator means comprises phase shifting means for adjusting the phase of the clock signal generated by said clock generator means in order to form said plural reference signals.

11. A scanning recording apparatus according to claim 10, wherein said phase shifting means comprises an integrating circuit composed of resistors and condensers and a Schmidt trigger circuit.

12. A scanning recording apparatus according to claim 9, wherein said synchronizing signal forming means comprises a delay circuit.

* * * * *

UNITED STATES PATENT AND TRADEMARK OFFICE
CERTIFICATE OF CORRECTION

PATENT NO. : 4,420,761
DATED : December 13, 1983
INVENTOR(S) : TAKASHI KITAMURA

It is certified that error appears in the above-identified patent and that said Letters Patent is hereby corrected as shown below:

Column 1, line 25, delete "give" (first occurrence);
line 41, delete "in".
Column 2, line 49, "bear" should be --beam--.

line 30, delete "consideration";
line 37, "in case" should be --where--.

line 57, change "comprises" to --includes--;
line 61, change "comprises" to --includes--;
line 62, after "resistors" change "and" to --,--;
line 66, change "comprises" to --includes--.

Signed and Sealed this

Twenty-sixth Day of June 1984

[SEAL]

Attest:

GERALD J. MOSSINGHOFF

*Attesting Officer*     *Commissioner of Patents and Trademarks*